Aug. 25, 1959 R. A. BARBEAU ET AL 2,901,041

AUTOMATIC COLUMN ERROR OBLITERATION FOR PAPER TAPE

Filed Dec. 30, 1955 3 Sheets-Sheet 1

INVENTORS
RAYMOND A. BARBEAU
HAROLD L. MEADE

BY

ATTORNEY

Aug. 25, 1959 R. A. BARBEAU ET AL 2,901,041

AUTOMATIC COLUMN ERROR OBLITERATION FOR PAPER TAPE

Filed Dec. 30, 1955 3 Sheets-Sheet 2

INVENTORS
RAYMOND A. BARBEAU
HAROLD L. MEADE
BY [signature]
ATTORNEY

United States Patent Office 2,901,041

Patented Aug. 25, 1959

2,901,041

AUTOMATIC COLUMN ERROR OBLITERATION FOR PAPER TAPE

Raymond A. Barbeau, Poughkeepsie, and Harold L. Meade, Wappingers Falls, N.Y., assignors to International Business Machines Corporation, New York, N.Y., a corporation of New York Application December 30, 1955, Serial No. 556,643

10 Claims. (Cl. 164—113)

This invention relates to a paper tape punch of the type shown in U.S. Patent 2,540,027, and in particular to an improved punch and feed control operative in response to a code punched in a tape column.

In tape conversion machines of the type shown in copending application Serial No. 486,472, filed February 7, 1955, now Patent No. 2,846,009, provision is made for punching predetermined code marks in cards punched from paper tape containing an error, and in still other tape conversion equipment, operation is interrupted if the tape code does not satisfy a predetermined check.

Accordingly, to prevent the interruption of tape reading operation, it is a first object of this invention to provide mechanism for punching a tape that will satisfy a predetermined code test.

It is a further object of this invention to provide mechanism for punching an error code in the tape after any tape column fails to satisfy a predetermined code check.

It is a still further object of this invention to provide a mechanism which will supply an impulse which can be utilized to signal the tape punch operator that an error has been entered in the tape.

Other objects of the invention will be pointed out in the following description and claims and illustrated in the accompanying drawings, which disclose, by way of example, the principle of the invention and the best mode, which has been contemplated, of applying that principle.

Figure 3A:
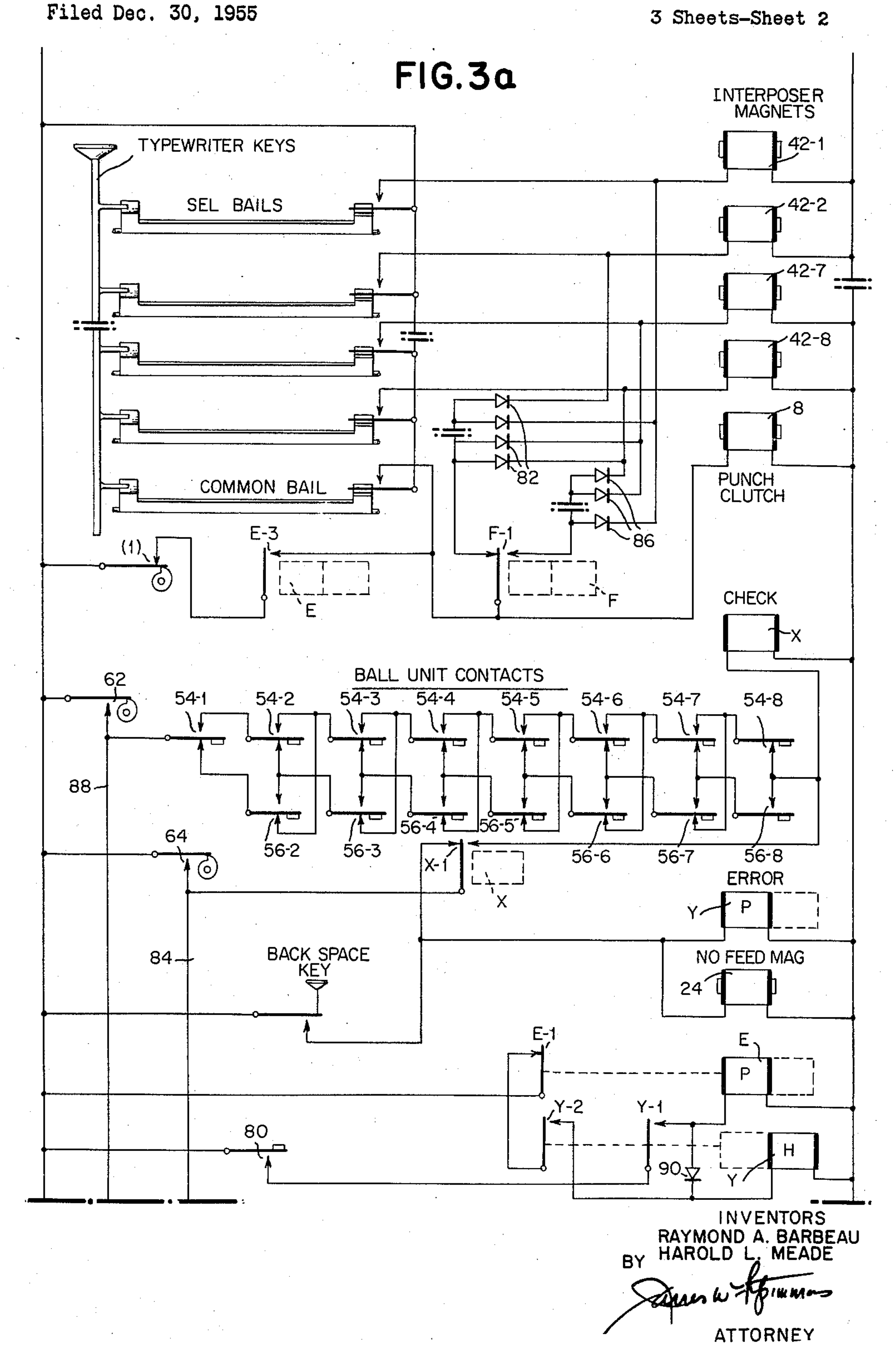
Figure 3B:
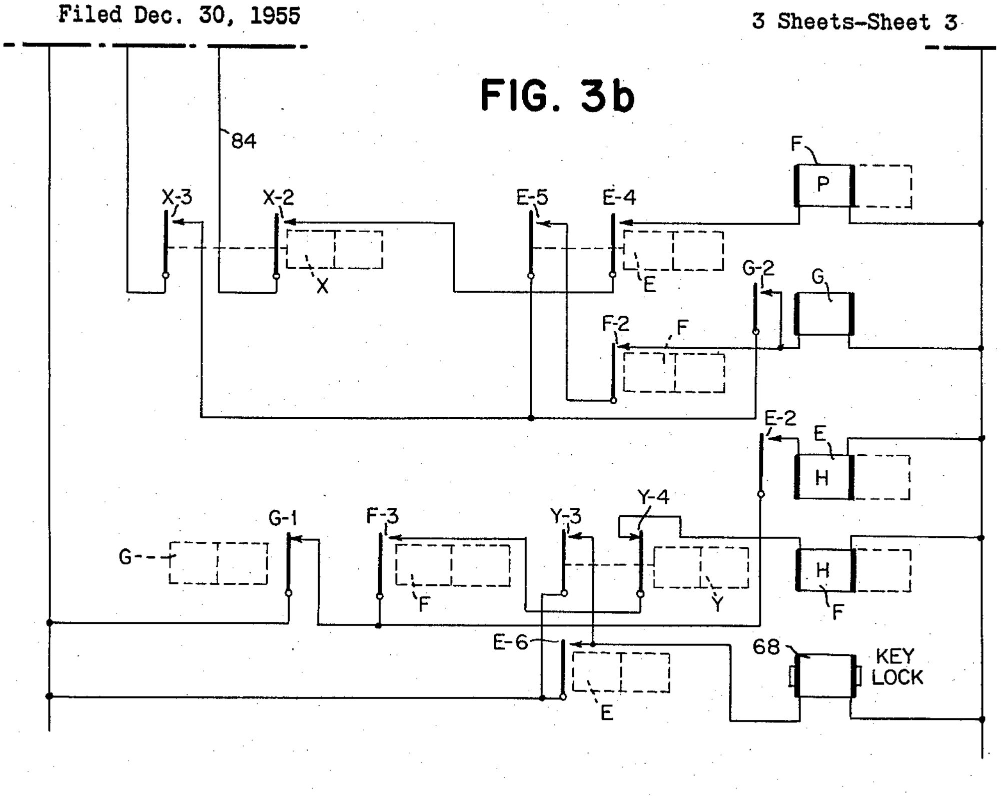

Figs. 3*a* and 3*b* are a schematic wiring diagram.

Figure 4:
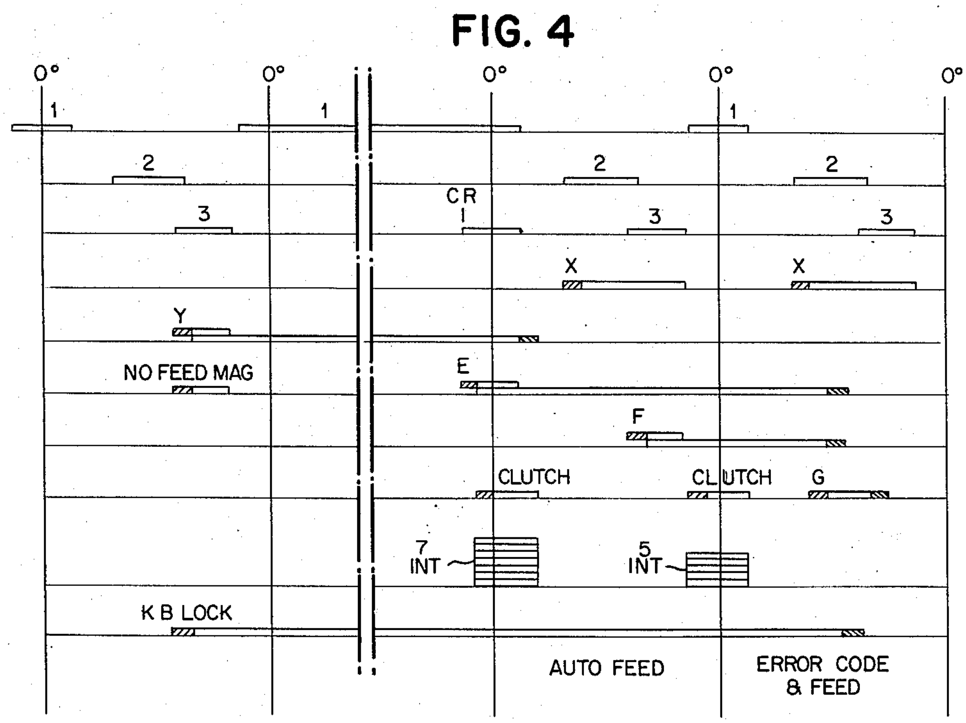

Fig. 4 is a sequence chart.

Briefly, this invention relates to an improved paper tape punch wherein provision is made for code checking the number of holes punched in any tape column, and then, depending on whether or not the code check was satisfied, either advance the tape if the code was satisfied, or obliterate the tape column (i.e. punch all code positions) if the code was not satisfied, and follow the obliterated column with an error code.

For purpose of illustration, but not limitation, the mechanism of this invention is described as being operative in response to the manipulation of a typewriter—e.g. a typewriter tape punch of the type shown in U.S. Patent 2,784,785 wherein for each print stroke, selector bails (K1 through 8, Fig. 3*a*) are closed to direct pulses to circuits later described.

Figure 1:
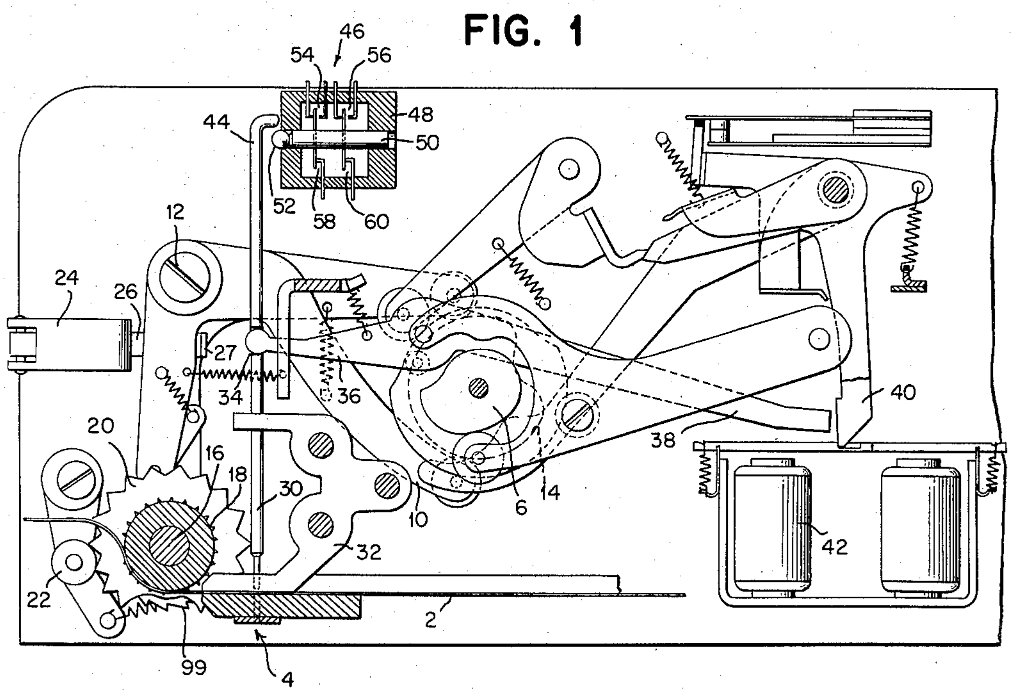
Fig. 1 is a side elevation of a tape punch.

Referring to the drawings, a tape punch of the type shown in U.S. Patent 2,540,027 is illustrated in Fig. 1, and since the punch is completely described in the patent, it is felt that a brief description will be sufficient for the purposes of this specification.

More specifically, a tape 2 is fed normally from right to left under a punching station 4 as shown in Fig. 1 in tape column cycles, that is, the tape is advanced one column for each cycle of the machine. A cycle is measured by one revolution of the shaft 6, which in turn, acts under control of a punch clutch magnet 8 shown in Fig. 3*a* of the drawing. Actually, the machine is equipped with a continuously rotating drive shaft (not shown) which is connected via a clutch to the shaft 6, and when the clutch magnet 8 is energized, the shaft 6 will go through one revolution.

Tape feeding takes place under control of the tape feed arm 10, which is pivotally supported on a pivot stud 12, incorporating a feed pawl (not shown), which revolves a ratchet wheel 99 in tape column steps. The ratchet wheel is secured to the shaft 16 which further has a pin wheel 18 which is the actual driving mechanism for the tape. The shaft 16 is further equipped with a detent wheel 20 acting in conjunction with a detent roller 22, to limit the movement of the tape in column cycles. The operation is such that at each revolution of the shaft 6, a cam 14 acts on the tape feed arm 10, rocking the same to cause one column feed of the tape 2.

In order to prevent tape feeding, a no feed magnet 24 is mounted adjacent the forward tape feed arm 10 and is equipped with an armature, including a bent over portion 27 which locks under the tape feed arm 10, whereby upon the energization of the no feed magnet 24, the armature 26 will be moved into position to hold tape feed arm 10 away from its cam 14 attached to the shaft 6. If the no feed magnet 24 is energized, there will be no forward feeding of the tape during that revolution of the drive shaft 6.

In order to punch the tape a plurality of tape punch pins 30 are provided which are slidably mounted in punch guide 32 to move into and out of engagement with the tape. Each pin 30 is equipped with a notch 34, which is engageable with a drive arm 36, which is pivotally supported about the shaft 6. The drive arm 36 has a tail 38, which will oscillate in response to the rotation of the shaft 6 so that there will be no movement of the drive arm 36 at its point of engagement with pin 30 unless its respective interposer 40 has been moved under the tail 38 of the punch arm.

The interposer 40, in turn, operates under control of the interposer punch magnet 42. It will be understood that there is one interposer punch magnet for each of the tape pins 30 and the punch magnets, in turn, are selected by the selector bails K1 through 8.

(It will be further understood that the drive shaft 6 is equipped with a plurality of cams for driving the punch drive arms 36 and with a plurality of other mechanical cams.)

Each punch pin 30 is further provided with an extension arm 44 having a bent over edge engageable with a ball unit 46. The ball unit 46 comprises a base member 48 which is mounted on the tape punch and a plurality of plungers 50—one for each of the punch pins 30—which plungers 50 are operable in transverse movement in response to one of the extensions 44 contacting a ball 52. More specifically, if the punch drive pin 30 is driven through the tape, its extension 44 will move across the ball 52 to move the plunger 50 to the right as viewed in Fig. 1. This transverse movement of the plunger 50 will act on the contacts 54 and 56. It will be understood that there is a contact 54 and a contact 56 for each of the positions of one of the tape punch pins 30. Further, each of the contacts 54 and 56 has a normally closed and a normally open side. In this mechanism, the actual contact wires 58 and 60 respectively, provide the natural resiliency for the plunger 50 biasing it normally to the left in position to be engaged by the extension 44.

With this mechanism, it can be appreciated that as the punch shaft 6 goes through one revolution, the drive pins 30 which actually perforate the tape will move down (if their tails 38 have been engaged by interposers 40) and their respective extensions 44 will act on the contacts 54 and 56. The problem is to determine whether or not a predetermined number, that is, say either odd or even (code check), of pins 30 perforate the tape. For example, it is possible that while the proper number of interposer magnets 42 receive an electrical impulse, they might not have acted to cause the interposer arms 40 to engage tails 38 so as to cause the punch drive pins to perforate the tape. Furthermore, the problem is to provide mechanism which acts in response to a code check failure to:

(1) Prevent tape feeding;

(2) Preventing further punching of the tape until certain corrective measures have been taken.

Figure 2:
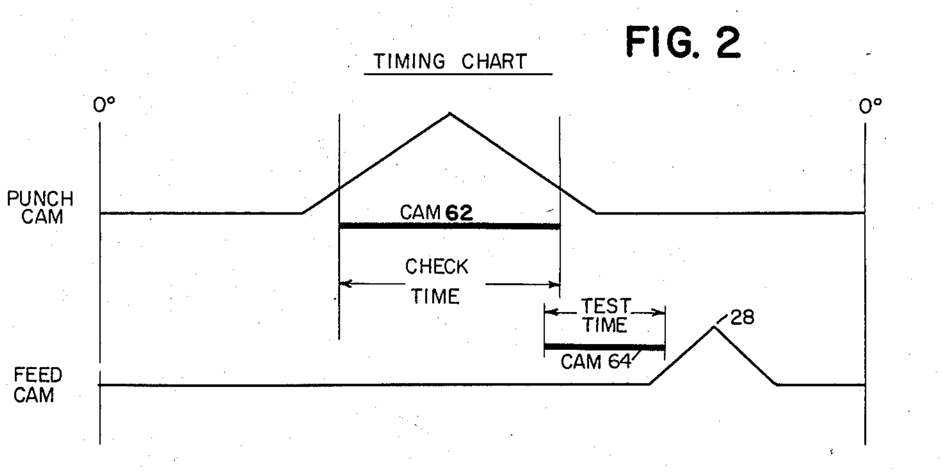
Fig. 2 is a timing diagram.

In order to lay the ground work for the solution to these problems, reference is made to the timing chart of Fig. 2. It can be appreciated that the punch cams, which are mounted on shaft 6, reach their high dwell position and have returned to rest before the feed cam 28 reaches the position wherein it can cause a feed cycle. The sequence then is such that the pins are first driven through the tape (and simultaneously cam 62 is closed for checking); then a test is made (cam 64) to determine whether a code check has been satisfied, and tape feeding will be interrupted if the code check is not satisfied.

Reference is now made to the schematic wiring diagram of Fig. 3 of the drawing wherein the ball unit contacts 54–1 through 8 are shown, and ball unit contacts 56–2 through 8 are shown. (56–1 is not used.) While for purposes of description, this machine is described in conjunction with an Odd number check it can be appreciated that through simple circuit changes the machine would operate equally as well under any given number of punched holes.

Since cam 62 is closed during punch time, a pulse is available through the contacts 54–1 through 8 and 56–2 through 8, and if an odd number of these contacts are closed, a circuit is available (as later described) so that the check relay X may be energized. Furthermore, the cam 64 will be closed and after check relay X is energized, the contact point X–1 will be transferred to hold up the check relay X through cam 64 time.

If the check relay X is not energized, however, then upon the closing of cam 64, a pulse is available through the normally closed X–1 contacts to the error relay Y and the no feed magnet 24.

In order to determine whether or not the check relay X is to be energized, it is necessary for the pulse through cam 62 to pass through an odd number of ball unit contacts. By way of example, let is be assumed that the 1, 2 and 5 punch pins 30 perforated the tape (thereby closing 54–1, 54–2, 54–5, 56–2, and 56–5) and the ball unit contact circuit will be analyzed on that basis. The pulse through cam 62 will pass through a contact 54–1 normally open, now closed, to 54–2 normally open, now closed, to 54–3 normally closed, 56–4 normally closed, 54–5 normally open, now closed, through 54–6 normally closed, 56–7 normally closed, and 54–8 normally closed to energize the check relay X.

If, on the other hand, only two of the punch pins 30 perforated the tape, for example, the number 4 and 8 pins, then the 54–4; 54–8 and 56–4; 56–8 contacts would be transferred. Accordingly, a pulse will pass through 54–1 normally closed, and through 56–2 normally closed, 54–3 normally closed, to 56–4 normally open, now closed, to 56–5 normally closed, 54–6 normally closed, to 56–7 normally closed, 54–8 now transferred so that the pulse does not get through to the check relay X.

As mentioned before, since the check relay X is not energized, both the error relay Y and the no feed magnet 24 will be energized. The error relay Y in turn, is provided with a hold circuit through its own contact Y–2, through the contact E–1 (of the auto feed relay E) back to the plus side of line. The no feed magnet 24, however, is energized only during cam 64 time of one cycle.

Further, the energization of the error relay Y will close the Y–3 contact point thereby providing a circuitry to the keyboard lock magnet 68 which, as shown in the copending application Serial No. 556,629, filed December 30, 1955, now Patent No. 2,852,076, prevents further strokes of the typewriter keyboard until error procedure is taken.

With the key board locked, the operator is instructed to go through a certain error procedure which has been described in copending application Serial No. 556,629, now Patent No. 2,852,076. That is, she has been told to hit the carriage return key on the typewriter in order to start the error procedure. The closing of the carriage return switch will initiate two cycles. The first cycle will be an auto feed cycle and the second cycle will be an error code and feed cycle. The auto feed cycle will obliterate the error information that has been in the tape and then the tape will be fed to the next column where an error code will be punched. That is, when the carriage return contact 80 is closed as a result of depression of the carriage return key on the typewriter, a circuit is available through the Y1 contact point normally open now closed (since Y is energized) to energize the auto feed relay E. A hold circuit is established for relay E through its own E–2 point to the G–1 point normally closed back to the positive side of the line. The energization of relay E further closes the E–6 contact point thereby providing a shunt circuit for the Y–3 contact point to hold up the key board lock magnet 68. Incidentally, with the energization of the auto feed relay E through carriage return contact 80 and normally open contact, now closed Y1, the E–1 contact point opened attempting to drop out the Y hold relay, but a shunt circuit is provided through Y1 and rectifier 90 to the Y hold relay as long as carriage return contact 80 is closed.

It will be recognized that since the punch is not operating at this time, the number 1 cam will be at its closed position as shown in the wiring diagram of Fig. 3, and therefore, a pulse is available through the E–3 contact point to the punch clutch 8 thereby initiating a punch cycle. The pulse through the E–3 contact point is also available to the F–1 point normally closed and through distributing rectifiers 82 to selected interposer magnets 42.

In this instance, seven of the magnets are actually selected, which is the auto feed code and accordingly, at that punch cycle with the seven of the interposers energized, seven holes will be perforated in the tape. This will obliterate the code in error that has been previously punched in the tape, since the code in error resulted in a no feed cycle whereby the error information was still at the punch station. During the auto feed punch cycle a code check is made, and assuming there is no error in that cycle—that is, a pulse is available through cam 62 and through the ball unit checking device to energize the check relay X and accordingly, through cam 64 and through X–1 normally open now closed, to hold up the check relay X at cam 64 time.

At cam 64 time, a pulse is also available through line 84 through the X–2 point normally open but now closed, through the E–4 point normally open but now closed, to energize the error code relay F. Relay F holds through G–1; F–3; and Y–4 contacts. At the end of the first cycle, wherein auto feed cycle is punched in the tape, the cam 1 makes and a circuit is available through the E–3 contact point normally open now closed to energize the punch clutch 8 in order to initiate the second punching cycle. A pulse is also available through the E–3 normally open now closed contact point through the F–1 normally open, now transferred, contact point through distributing rectifiers 86 to selected interposer magnet 42 which have been determined as representing an error code in the tape. (In this case, it is five holes.)

During the error punching cycle and at cam 62 time, a check will be made through the ball contact units 54–56 to see whether or not an odd number of holes have been punched and if so, the check relay X will be energized. This relay will hold through cam 64 time through the X–1 normally open now closed contact point. At cam 62 time a pulse was also available through line 88 and when the X check relay has been energized, then the pulse will pass through the X–3 point normally open, now closed, through the E–5 point normally open, now closed, through the F–2 point normally open, now closed to energize drop out relay G. The drop out relay G has a contact point G–2 which provides a circuit which shunts the E–5 and the F–2 contacts, and so long as the X relay is up, a hold circuit is provided for the drop out relay G through cam 62 time.

The energization of the G relay will open the G–1 contact point, and therefore the hold circuits for both the auto feed relay E and the error hold relay F are deenergized. It will be obvious that since the E relay drops out, the E–3 contact is open and therefore, pulses are no longer available to the clutch magnet 8 and no further cycles will take place unless manually initiated by the typist at the typewriter.

With the mechanism described in the first cycle after the carriage return key has been depressed, if the correct code is not punched in the tape—that is, if it does not satisfy the ball check unit test to pick up the check relay X, then auto feed cycles will recur continuously until a correct signal has been punched in the tape satisfying the ball check test to pick up the X relay and the tape will not be fed until the X relay has been energized. In the following cycle, however, wherein the error code is to be punched in the tape, if the ball check unit is not satisfied, then the machine will revert back to an auto feed cycle and would continue this sequence of auto feed and then error punching until the two cycles have been satisfactorily completed. It is only when the two cycles have been completed satisfactorily that the drop out relay G will be energized bringing the machine back to normal conditions wherein it can be operated again by the typewriter key board.

In summary, this operation is explained again with reference to the wiring diagram of Fig. 3. After an error, when the carriage return key 80 has been operated, the auto feed relay E will be picked up. The E relay has a hold circuit through the drop out relay G–1 contact point and E will stay up sending a cyclic pulse both to the punch clutch 8 and through the error relay contact F–1 normally closed to the distributing rectifiers 82 to send an auto feed pulse to the interposer magnets 42, until the F–1 contact point is transferred by the energization of the F relay. F relay cannot transfer, however, until the code check relay X has been energized. Therefore, the error code signal cannot be punched until the auto feed signal satisfies the check relay.

Furthermore, the drop out relay G cannot be energized during the error cycle unless the X–3 contact point is closed, thereby indicating a satisfactory insertion in the tape of the error signal. The drop out relay G restores the machine to normal.

It should be further recognized that during the punching of the error code cycle, should the error relay Y be energized, through the punching of an error signal not satisfying the X check, the Y–4 contact point will open the hold circuit to the error code relay F thereby transferring the F–1 contact point back to its normally closed side to punch error auto feed signals. If the X relay is not satisfied, the no feed magnet 24 can be energized and therefore, the tape will remain at the punch station with an incorrect code punched in it. Since the G relay is not picked up, the E relay is still picked up and at the completion of the cycle which was supposed to be the error code cycle, a pulse is available through the (1) cam and through the E–3 contact point through F–1 normally closed through the distributing rectifier 82 to energize interposer magnets 42 to punch an error auto feed code. It will be recognized that the punch clutch magnet 8 also would have been energized during that cycle. This will return the sequence so that the two cycles (auto feed followed by error) will have to be completed in sequence before the G relay can be energized.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A tape punching machine having clutch controlled means for operating the same in individual punch cycles comprising punch pins for perforating a tape, interposer magnets for selectively controlling the punch pins which are to be operable in each punch cycle, a tape feed arm operable to feed a tape one column for each punch cycle, a no feed magnet having connections when energized for disabling said tape feed arm, normally closed circuit means during each cycle for energizing said no feed magnet, a mechanism responsive to the operation of predetermined punch pin combinations for interrupting the circuit to said no feed magnet, and means selectively operable when said no feed magnet is energized for operating all of said interposer magnets and said clutch controlled means.

2. A tape punching machine having clutch controlled means for operating the same in individual punch cycles comprising punch pins for perforating a tape, interposer magnets for selectively controlling the punch pins which are to be operable in each punch cycle, a tape feed arm operable to feed a tape one column for each punch cycle, a no feed magnet having connections when energized for disabling said tape feed arm, normally closed circuit means during each cycle for energizing said no feed magnet, and mechanism responsive to the operation of predetermined punch pin combinations for interrupting the circuit to said no feed magnet comprising check circuit means conditioned by the operative punch pins in each punch cycle, a check relay electrically connected in series with a predetermined path through said check circuit, electrical means for sending a pulse through said checking circuit during each punch cycle whereby a pulse is available to energize said check relay only when said predetermined checking path has been established, switch means responsive to the energization of said check relay for interrupting the circuit to said no feed magnet, and manually operable means effective when said switch means is not operated for actuating said clutch controlled means and said interposer magnets.

3. In a tape punching machine having clutch means operating the same in individual punch cycles, punch pins for perforating a tape, interposer magnets for selectively controlling the punch pins which are to be operable in each punch cycle, a tape feed arm operable to advance a tape one column for each punch cycle, a no feed magnet having connections when energized for disabling said tape feed arm, and a normally closed circuit means during each cycle for energizing said no feed magnet, a mechanism responsive to predetermined conditions in said tape punch for interrupting said no feed magnet circuit comprising check circuit means conditioned by the operative punch pins in each punch cycle, electrical means for sending a pulse through said checking circuit during each punch cycle, switch means responsive to a pulse through said check circuit for interrupting the circuit to said no feed magnet, and selectively operable means for conditioning said clutch means and all of said interposer magnets to perforate said tape when said predetermined conditions are not satisfied.

4. A tape punching machine having clutch means operating the same in individual punch cycles comprising punch pins for perforating the tape in code designations indicative of data, interposer magnets for controlling the punch pins which are to be operable in each punch cycle, selectively operable control means including circuits for energizing said interposer magnets, a tape feed arm operable to advance a tape one column for each punch cycle, a no feed magnet having connections when energized for disabling said tape feed arm, normally closed circuit means during each punch cycle for energizing said no feed magnet thereby disabling said tape feed arm, a mechanism responsive to the operation of predetermined punch pin combinations for interrupting said no feed magnet circuit, and selectively operable error deletion means effective when said no feed magnet is energized for deleting the last punched code designation.

5. In a tape punching machine having clutch means operating the same in individual punch cycles, punch pins for perforating a tape, interposer magnets for selectively controlling the punch pins which are to be operable in each punch cycle, a tape feed arm operable to advance a tape one column for each punch cycle, a no feed magnet having connections when energized for disabling said tape feed arm, and a normally closed circuit means during each cycle for energizing said no feed magnet, a device responsive to predetermined conditions in said tape punch for interrupting said no feed magnet circuit comprising check circuit means including a plurality of pairs of contacts, each pair conditioned by its operative punch pin in each punch cycle, a check relay electrically connected in series with a predetermined path through said check circuit, electrical means for sending a pulse through said checking circuit during each punch cycle whereby a pulse is available to energize said check relay only when said predetermined checking path has been established, and switch means responsive to the energization of said check relay for interrupting the circuit to said no feed magnet.

6. A tape punching machine having clutch means operating the same in individual punch cycles comprising punch pins for perforating the tape with character code notations including an error deletion notation and an error indicating notation, interposer magnets for controlling the punch pins which are to be operable in each punch cycle, selectively operable control means including circuits for energizing said interposer magnets a tape feed arm operable to advance a tape one column for each punch cycle, a no feed magnet having connections when energized for disabling said tape feed arm, normally closed circuit means during each punch cycle for energizing said no feed magnet thereby disabling said tape feed arm, error relay means having connections disabling said selectively oeprable control means, a mechanism responsive to the operations of predetermined punch pin combinations for interrupting both said no feed magnet and said error relay circuits, and selectively operable means conditioned by said error relay when energized for causing said error deletion notation and said error indicating notation to be sequentially punched in said tape.

7. A tape punching machine having clutch means operating the same in individual punch cycles comprising punch pins for perforating the tape, interposer magnets for controlling the punch pins which are to be operable in each punch cycle, selectively operable control means including circuits for energizing said interposer magnets, a tape feed arm operable to advance a tape one column for each punch cycle, a no feed magnet having connections when energized for disabling said tape feed arm, normally closed circuit means during each punch cycle for energizing said no feed magnet thereby disabling said tape feed arm, a mechanism including a plurality of transfer switches, a pair of said transfer switches associated with each of said punch pins and each pair actuated by its respective operative punch pin, said mechanism responsive to the operation of predetermined transfer switch combinations for interrupting said no feed magnet circuit comprising check circuit means conditioned by the operative punch pins in each punch cycle, electrical means for sending a pulse through said checking circuit during each punch cycle and switch means responsive to a pulse through said check circuit for interrupting the circuit to said no feed magnet.

8. In a tape punch machine having clutch means operating the same in individual punch cycles, punch pins for perforating the tape, interposer magnets for controlling the punch pins which are to be operable in each punch cycle, selectively operable control means including circuits for energizing said interposer magnets, a tape feed arm operable to advance a tape one column for each punch cycle, a no feed magnet having connections when energized for disabling said tape feed arm, normally closed circuit means during each punch cycle for energizing said no feed magnet thereby disabling said tape feed arm, error relay means having connections disabling said selectively operable control means, normally operable circuit means during each punch cycle for energizing said error relay, a mechanism including a plurality of transfer switches, a pair of said transfer switches associated with each of said punch pins and each pair activated by its respective operative punch pin, effective for interrupting both said no feed magnet and said error relay circuits comprising check circuit means conditioned by said operative transfer switches in each punch cycle, a check relay electrically connected in series with a predetermined path through said check circuit, electrical means for sending a pulse through said checking circuit during each punch cycle whereby a pulse is available to energize said check relay only when said predetermined checking path has been established, and switch means responsive to the energization of said check relay for interrupting the circuit to said no feed magnet and said error relay.

9. A tape punching machine having clutch means operating the same in individual punch cycles comprising punch pins for perforating the tape, interposer magnets for controlling the punch pins which are to be operable in each punch cycle, selectively operable control means including circuits for energizing said interposer magnets, error relay means having connections disabling said selectively operable control means, normally operable circuit means during each punch cycle for energizing said error relay, a mechanism responsive to the operation of predetermined punch pin combinations for interrupting said error relay circuit, and circuit means manually operable when said error relay is energized for energizing one combination of said interposer magnets and said clutch to obliterate the punched information in the tape column at the tape punch comprising a relay including circuitry having contact points in series with said punch clutch and said one combination of interposer magnets to initiate a punch cycle.

10. A tape punching machine having clutch means operating the same in individual punch cycles comprising punch pins for perforating the tape, interposer magnets for controlling the punch pins which are to be operable in each punch cycle, selectively operable control means including circuits for energizing said interposer magnets, error relay means having connections disabling said selectively operable control means, normally operable circuit means during each punch cycle for energizing said error relay, a mechanism responsive to the operation of predetermined punch pin combinations for interrupting said error relay circuit, and circuit means manually operable when said error relay is energized for energizing one combination of said interposer magnets and said clutch to obliterate the punched information in the tape column at the tape punch comprising a relay including circuitry having contact points in series with said punch clutch and said one combination of interposer magnets to initiate a punch cycle, means responsive to the punching of said one combination of interposer controlled punch pins for initiating a second punch cycle to energize a second combination of interposer magnets and said clutch comprising, a second relay in series with said first relay having normally closed contact points in said one combination of interposer circuit and normally open contacts in said second combination of interposer magnet circuits.

References Cited in the file of this patent

UNITED STATES PATENTS

| | | |
|---|---|---|
| Re. 22,394 | Moore et al. | Nov. 23, 1943 |
| 2,348,214 | Gubisch | May 9, 1944 |
| 2,366,434 | Brown | Jan. 2, 1945 |
| 2,379,865 | Connery et al. | July 10, 1945 |
| 2,647,580 | Connolly | Aug. 4, 1953 |
| 2,672,601 | Welby | Mar. 16, 1954 |